US012790567B2

(12) United States Patent
Tibbetts et al.

(10) Patent No.: US 12,790,567 B2
(45) Date of Patent: *Nov. 10, 2026

(54) CLEANING SOLUTION AND METHODS OF CLEANING A TURBINE ENGINE

(71) Applicant: General Electric Company, Evendale, OH (US)

(72) Inventors: Nicole Jessica Tibbetts, Delanson, NY (US); Evan J. Dolley, Niskayuna, NY (US); Bernard Patrick Bewlay, Niskayuna, NY (US); Denise Anne Anderson, Mechanicville, NY (US); Nathan David McLean, Glenville, NY (US); Eric John Telfeyan, Delanson, NY (US); Frank Wagenbaugh, Leeds, NY (US)

(73) Assignee: General Electric Company, Evendale, OH (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/979,035

(22) Filed: Dec. 12, 2024

(65) Prior Publication Data

US 2025/0109356 A1 Apr. 3, 2025

Related U.S. Application Data

(60) Continuation of application No. 18/383,705, filed on Oct. 25, 2023, now Pat. No. 12,187,986, which is a (Continued)

(51) Int. Cl.
*C11D 3/20* (2006.01)
*B08B 3/08* (2006.01)
(Continued)

(52) U.S. Cl.
CPC .............. *C11D 3/2086* (2013.01); *B08B 3/08* (2013.01); *C11D 1/83* (2013.01); *C11D 1/94* (2013.01);
(Continued)

(58) Field of Classification Search
CPC .... B08B 3/08; C11D 1/72; C11D 1/83; C11D 1/88; C11D 1/94; C11D 2111/20;
(Continued)

(56) References Cited

U.S. PATENT DOCUMENTS 2,466,632 A 4/1949 Borus
3,085,915 A 4/1963 Heitmann
(Continued)

FOREIGN PATENT DOCUMENTS

CN 1103927 A 6/1995
CN 1875131 12/2006
(Continued)

OTHER PUBLICATIONS

Citranox Technical Bulletin by Alconox, Inc. (Year: 2006).*
(Continued)

*Primary Examiner* — Douglas Lee
(74) *Attorney, Agent, or Firm* — Fitch, Even, Tabin & Flannery LLP

(57) ABSTRACT

A cleaning solution for a turbine engine includes water; a first organic acidic component that comprises citric acid; a second organic acidic component that comprises glycolic acid; isopropylamine sulphonate; alcohol ethoxylate; triethanol amine; and sodium lauriminodipropionate. The cleaning solution has a pH value between about 2.5 and about 7.0.

1 Claim, 11 Drawing Sheets

Related U.S. Application Data continuation of application No. 15/936,318, filed on Mar. 26, 2018, now Pat. No. 11,834,632, which is a division of application No. 14/874,924, filed on Oct. 5, 2015, now Pat. No. 9,926,517, which is a continuation-in-part of application No. 14/484,897, filed on Sep. 12, 2014, now abandoned.

(60) Provisional application No. 61/913,805, filed on Dec. 9, 2013.

(51) Int. Cl.

| | |
|---|---|
| ***C11D 1/72*** | (2006.01) |
| ***C11D 1/83*** | (2006.01) |
| ***C11D 1/88*** | (2006.01) |
| ***C11D 1/94*** | (2006.01) |
| ***C11D 3/30*** | (2006.01) |
| ***C11D 3/34*** | (2006.01) |
| ***C23G 1/02*** | (2006.01) |
| ***C23G 1/06*** | (2006.01) |
| ***C23G 1/08*** | (2006.01) |
| ***F01D 25/00*** | (2006.01) |

(52) U.S. Cl.

CPC .............. *C11D 3/2075* (2013.01); *C11D 3/30* (2013.01); *C11D 3/3409* (2013.01); *C23G 1/02* (2013.01); *C23G 1/061* (2013.01); *C23G 1/088* (2013.01); *F01D 25/002* (2013.01); *C11D 1/72* (2013.01); *C11D 1/88* (2013.01); *C11D 2111/20* (2024.01); *Y02T 50/60* (2013.01)

(58) Field of Classification Search

CPC ....... C11D 3/2075; C11D 3/2086; C11D 3/30; C11D 3/3409; C23G 1/02; C23G 1/061; C23G 1/088; F01D 25/002; Y02T 50/60

See application file for complete search history.

(56) References Cited

U.S. PATENT DOCUMENTS

| | | | | |
|---|---|---|---|---|
| 3,297,481 | A | 1/1967 | Newman | |
| 4,808,235 | A | 2/1989 | Woodson | |
| 4,970,014 | A | 11/1990 | Garcia | |
| 4,988,414 | A | 1/1991 | Westerman, Jr. | |
| 5,002,078 | A | 3/1991 | Kaes | |
| 5,011,540 | A | 4/1991 | McDermott | |
| 5,018,320 | A | 5/1991 | Anguelo | |
| 5,075,040 | A | 12/1991 | Rivenaes | |
| 5,076,855 | A | 12/1991 | Kaes | |
| 5,154,197 | A | 10/1992 | Auld | |
| 5,248,381 | A | 9/1993 | Dunker | |
| 5,279,760 | A | 1/1994 | Sato | |
| 5,385,014 | A | 1/1995 | Rathbun | |
| 6,156,129 | A | 12/2000 | Hlivka | |
| 6,310,022 | B1 | 10/2001 | Amiran | |
| 6,311,704 | B1 | 11/2001 | Foster | |
| 6,394,108 | B1 | 5/2002 | Butler | |
| 6,454,870 | B1 | 9/2002 | Brooks | |
| 6,478,033 | B1 | 11/2002 | Foster | |
| 6,491,048 | B1 | 12/2002 | Foster | |
| 6,503,334 | B2 | 1/2003 | Ruiz | |
| 6,630,198 | B2 | 10/2003 | Ackerman | |
| 6,883,527 | B2 | 4/2005 | Travaly | |
| 6,916,429 | B2 | 7/2005 | Kool | |
| 6,932,093 | B2 | 8/2005 | Ogden | |
| 6,982,241 | B2 | 1/2006 | Smith | |
| 7,018,965 | B2 | 3/2006 | Yan | |
| 7,033,979 | B2 | 4/2006 | Herwig | |
| 7,065,955 | B2 | 6/2006 | Reback | |
| 7,115,171 | B2 | 10/2006 | Powers | |
| 7,185,663 | B2 | 3/2007 | Koch | |
| 7,531,048 | B2 | 5/2009 | Woodcock | |
| 8,028,936 | B2 | 10/2011 | Mcdermott | |
| 8,277,647 | B2 | 10/2012 | Rice | |
| 8,377,232 | B2 | 2/2013 | Myers | |
| 8,535,449 | B2 | 9/2013 | Hughes | |
| 9,138,782 | B2 | 9/2015 | Dorshimer | |
| 9,739,168 | B2 | 8/2017 | Ekanayake | |
| 9,926,517 | B2 * | 3/2018 | Tibbetts | C23G 1/088 |
| 9,932,854 | B1 * | 4/2018 | Tibbetts | C11D 3/30 |
| 9,951,647 | B2 | 4/2018 | Rawson | |
| 9,957,066 | B2 | 5/2018 | Bewlay | |
| 10,005,111 | B2 | 6/2018 | Eriksen | |
| 10,018,113 | B2 | 7/2018 | Bewlay | |
| 10,227,891 | B2 | 3/2019 | Eriksen | |
| 10,323,539 | B2 | 6/2019 | Bewlay | |
| 10,377,968 | B2 | 8/2019 | Brooks | |
| 10,385,723 | B2 | 8/2019 | Flynn | |
| 10,634,004 | B2 | 4/2020 | Giljohann | |
| 10,669,885 | B2 | 6/2020 | Pecchiol | |
| 10,920,181 | B2 | 2/2021 | Martin | |
| 11,027,317 | B2 | 6/2021 | Tibbetts | |
| 11,441,446 | B2 | 9/2022 | Rawson | |
| 11,834,632 | B2 * | 12/2023 | Tibbetts | B08B 3/08 |
| 12,187,986 | B2 * | 1/2025 | Tibbetts | C23G 1/02 |
| 2002/0100492 | A1 | 8/2002 | Risbeck | |
| 2002/0103093 | A1 | 8/2002 | LaGraff | |
| 2002/0155969 | A1 | 10/2002 | Rees | |
| 2002/0187918 | A1 * | 12/2002 | Urban | C11D 3/43<br>510/505 |
| 2003/0108305 | A1 | 6/2003 | Lo Curzio | |
| 2004/0016449 | A1 | 1/2004 | Travaly | |
| 2005/0049168 | A1 | 3/2005 | Yan | |
| 2005/0239676 | A1 | 10/2005 | Gaudreault | |
| 2007/0062201 | A1 | 3/2007 | Reback | |
| 2007/0062562 | A1 | 3/2007 | Leaphart | |
| 2008/0277288 | A1 | 11/2008 | Kruger | |
| 2009/0084411 | A1 | 4/2009 | Woodcock | |
| 2009/0235954 | A1 | 9/2009 | Lakdawala | |
| 2010/0129544 | A1 | 5/2010 | Ott | |
| 2010/0152086 | A1 | 6/2010 | Wu | |
| 2010/0178158 | A1 | 7/2010 | Fish | |
| 2010/0243000 | A1 | 9/2010 | Andreas | |
| 2011/0259375 | A1 | 10/2011 | Gebhardt | |
| 2011/0278194 | A1 * | 11/2011 | Zhu | C11D 3/30<br>206/524.7 |
| 2012/0125445 | A1 | 5/2012 | Simpson-Green | |
| 2012/0165240 | A1 | 6/2012 | Finison | |
| 2013/0019895 | A1 | 1/2013 | Hughes | |
| 2013/0081654 | A1 | 4/2013 | Harvell | |
| 2013/0137622 | A1 | 5/2013 | Borst | |
| 2013/0174869 | A1 | 7/2013 | Juergen | |
| 2013/0199040 | A1 | 8/2013 | Dudeck | |
| 2014/0261565 | A1 | 9/2014 | Hulse | |
| 2015/0159122 | A1 | 6/2015 | Tibbetts | |
| 2016/0024438 | A1 | 1/2016 | Tibbetts | |
| 2016/0032761 | A1 | 2/2016 | Griffiths | |
| 2016/0236799 | A1 | 8/2016 | Bewlay | |
| 2017/0165721 | A1 | 6/2017 | Tibbetts | |
| 2017/0167290 | A1 | 6/2017 | Kulkarni | |
| 2017/0191376 | A1 | 7/2017 | Eriksen | |
| 2017/0204739 | A1 | 7/2017 | Rawson | |
| 2017/0254217 | A1 | 9/2017 | Eriksen | |
| 2018/0149038 | A1 | 5/2018 | Eriksen | |
| 2018/0155060 | A1 | 6/2018 | Dauenhauer | |
| 2018/0216036 | A1 | 8/2018 | Tibbetts | |
| 2018/0237163 | A1 | 8/2018 | Bewlay | |
| 2018/0245477 | A1 | 8/2018 | Kulkarni | |
| 2018/0258787 | A1 | 9/2018 | Tibbetts | |
| 2018/0291803 | A1 | 10/2018 | Belay | |
| 2018/0298781 | A1 | 10/2018 | Tibbetts | |
| 2018/0313225 | A1 | 11/2018 | Millhaem | |
| 2018/0355751 | A1 | 12/2018 | Tibbetts | |
| 2019/0153890 | A1 | 5/2019 | Eriksen | |
| 2019/0323378 | A1 | 10/2019 | Tibbetts | |
| 2020/0102523 | A9 | 4/2020 | Tibbetts | |
| 2021/0108537 | A1 | 4/2021 | Rigg | |

(56) References Cited

U.S. PATENT DOCUMENTS

| | | | |
|---|---|---|---|
| 2021/0317752 | A1 | 10/2021 | Deja |
| 2024/0060010 | A1 | 2/2024 | Tibbetts |

FOREIGN PATENT DOCUMENTS

| | | | |
|---|---|---|---|
| CN | 101768749 | A | 7/2010 |
| CN | 104785467 | A | 7/2015 |
| CN | 104791100 | A | 7/2015 |
| DE | 102013202616 | A1 | 8/2014 |
| DE | 102015006330 | | 11/2016 |
| EP | 0299166 | | 1/1989 |
| EP | 0368205 | | 5/1990 |
| EP | 1204731 | | 5/2002 |
| EP | 2243562 | A1 | 10/2010 |
| EP | 2594773 | A2 | 5/2013 |
| JP | S6421088 | A | 1/1989 |
| JP | H05500237 | A | 1/1993 |
| JP | H09512605 | A | 12/1997 |
| JP | 2001214755 | A | 8/2001 |
| JP | 2010101317 | A | 5/2010 |
| JP | 2015059219 | A | 3/2015 |
| JP | 2015113836 | A | 6/2015 |
| JP | 2015148226 | A | 8/2015 |
| WO | 92014557 | A1 | 9/1992 |
| WO | 9844167 | A1 | 10/1998 |
| WO | 2005120953 | A1 | 12/2005 |
| WO | 2006131689 | | 12/2006 |
| WO | 2007027522 | | 3/2007 |
| WO | 2009129788 | A2 | 10/2009 |
| WO | 2013017854 | A1 | 2/2013 |
| WO | 2020022474 | A1 | 1/2020 |
| WO | 2020030516 | A1 | 2/2020 |

OTHER PUBLICATIONS

Alconox "CitraJet Low-Foaming Liquid Acid Cleaner" Alconox, Inc. 2018 (2 pages).

Alconox "Citranox Acid Cleaner and Detergent" Alconox, Inc. 2018 (2 pages).

Alconox "Detergent 8 Low-Foaming Ion-Free Detergent" Alconox, Inc. 2018 (2 pages).

Alconox "Luminox Low-Foaming Neutral Cleaner" Alconox, Inc. 2006 (2 pages).

BASF "Global Oilfield Solutions Corrosion Inhibitors for Production: Basecorr" BASF 2017 (6 pages).

Extended European Search Report and Opinion issued in connection with corresponding EP Application No. 16191596.2 dated Mar. 8, 2017.

Ex Parte Quayle Action towards U.S. Appl. No. 14/874,924 dated Sep. 22, 2017.

Final Rejection towards U.S. Appl. No. 14/743,215 dated Nov. 30, 2017.

Final Rejection towards U.S. Appl. No. 14/484,897 dated Aug. 13, 2018.

Luminox Technical Bulletin by Alconox, Inc. {Year: 2006).

Machine translation and Decision to Grant issued in connection with corresponding JP Application No. 2016-187672 on Nov. 7, 2017.

Machine translation and First Office Action and Search issued in connection with corresponding CN Application No. 201611173927.0 on Aug. 23, 2018.

Non-Final Rejection towards U.S. Appl. No. 14/743,215 dated Jul. 25, 2018.

Parchem Safety Data Sheet Sodium Lauriminodipropionate dated Oct. 27, 2015 (Year: 2015).

Parchem Safety Data Sheet, Sodium Lauriminodipropionate, Oct. 27, 2015, 7 pp.

Screenshot of DeTeric LP Sodium Lauriminodipropionate webpage from https://www.knowde.com/stores/ verdant-specialty-solutions/products/deteric-lp-sodium-lauriminodipropionate (Year: 2023).

Screenshot of DeTeric LP Sodium Lauriminodipropionate webpage from https://www.knowde.com/stores/verdant-specialty-solutions/products/deteric-lp-sodium-lauriminodipropionate, 2023.

Turco® Scale GON #5 Mildly Acidic Scale Conditioner, Technical Information Bulletin, Henkel Technologies, pp. 1-2 (Jun. 1999).

USPTO; U.S. Appl. No. 13/152,350; Final Rejection mailed May 31, 2023; (pp. 1-9).

USPTO; U.S. Appl. No. 13/152,350; Non-Final Rejection mailed Feb. 27, 2023; (pp. 1-9).

USPTO; U.S. Appl. No. 13/152,350; Notice of Allowance and Fees Due (PTOL-85) mailed Aug. 2, 2023; (pp. 1-8).

USPTO; U.S. Appl. No. 17/158,680; Non-Final Rejection mailed May 20, 2024; (pp. 1-9).

USPTO; U.S. Appl. No. 17/158,680; Notice of Allowance and Fees Due (PTOL-85) mailed Aug. 27, 2024; (pp. 1-8).

* cited by examiner

CLEANING SOLUTION AND METHODS OF CLEANING A TURBINE ENGINE

CROSS-REFERENCE TO RELATED APPLICATION(S)

This application is a continuation of U.S. application Ser. No. 18/383,705 filed Oct. 25, 2023, entitled, entitled, "CLEANING SOLUTION AND METHODS OF CLEANING A TURBINE ENGINE", which is a continuation of U.S. application Ser. No. 15/936,318 filed on Mar. 26, 2018, which is a divisional of U.S. application Ser. No. 14/874,924 filed on Oct. 5, 2015, which is a continuation-in-part of U.S. Ser. No. 14/484,897 filed Sep. 12, 2014, which claims priority to provisional U.S. Application No. 61/913,805, which was filed on Dec. 9, 2013, which are all incorporated herein by reference.

BACKGROUND

The present disclosure relates generally to turbine engines and, more specifically, to systems and methods of cleaning turbine engines using a reagent composition that selectively dissolves constituents of foreign material therefrom.

Aircraft engines used to propel aircraft through certain routes often experience significant fouling due to heavy environmental particulate matter intake during flight, idling, take-off, and landing. Environmental fouling degrades performance in turbine components of such known aircraft engines. For example, one known mechanism for fouling is the increased roughness of turbine components caused by mineral dust ingestion. Specifically, this increased roughness results from the formation of micropits caused by particle impact. Subsequently, mineral dust particles accumulate in these pits and block cooling passages by forming layers of fouling material therein. High temperatures on surfaces in downstream stages of the turbine result in thermal alteration and solid-state mineral reactions of the accumulated mineral dust particles, which forms a calcia, magnesia, alumina, silica (CMAS) based reaction product. Consequently, water wash treatments, which are frequently used to clean the turbine components, often are not successful in removing the accumulated mineral dust and its secondary reaction products.

At least one known method of removing the accumulated mineral dust includes impinging dry ice particles against the turbine components. More specifically, the dry ice particles expand as they sublimate to facilitate cleaning the turbine components. However, dry ice is not specifically tailored to dissolve fouling deposits based on the elemental composition of the accumulated mineral dust and its reaction products, and instead focuses on mechanical removal of the foulant. Another known method includes treating surfaces of the turbine engine with an acid solution including $H_xAF_6$. Such known acid solutions are generally only tailored to remove low-temperature reaction-based products of mineral dust, and are generally only applied following engine teardown in a service repair shop environment.

SUMMARY

According to one example of the present technology, method of cleaning a turbine engine comprises directing a cleaning solution towards a component of the turbine engine having a layer of foreign material thereon, the layer of foreign material formed at least partially from at least one of thermal reaction products of the foreign material and interstitial cement, to at least partially remove the foreign material from the component, the cleaning solution comprising, consisting essentially of, or consisting of water within a range between about 68.65 percent and about 99.63 percent by volume of the cleaning solution; an organic acidic component within a range between about 0.1 percent and about 15 percent by volume of the cleaning solution; wherein the organic acid comprises citric acid; an organic acidic component within a range between about 0.1 percent and about 15 percent by volume of the cleaning solution; wherein the organic acid comprises glycolic acid; isoropylamine sulphonate within a range between about 0.07 percent and 0.14 percent by volume of the cleaning solution; alcohol ethoxylate within a range between about 0.035 percent and 0.07 percent by volume of the cleaning solution; triethanol amine within a range between about 0.035 percent and 0.07 percent by volume of the cleaning solution; sodium lauriminodipropionate within a range between about 0.03 percent and 1.0 percent by volume of the cleaning solution; wherein the cleaning solution has a pH value in the range between about 2.5 and about 7.0.

According to another example of the present technology, a cleaning solution for a turbine engine comprises water within a range between about 68.65 percent and about 99.63 percent by volume of the cleaning solution; an organic acidic component within a range between about 0.1 percent and about 15 percent by volume of the cleaning solution; wherein the organic acid comprises citric acid; an organic acidic component within a range between about 0.1 percent and about 15 percent by volume of the cleaning solution; wherein the organic acid comprises glycolic acid; isoropylamine sulphonate within a range between about 0.07 percent and 0.14 percent by volume of the cleaning solution; alcohol ethoxylate within a range between about 0.035 percent and 0.07 percent by volume of the cleaning solution; triethanol amine within a range between about 0.035 percent and 0.07 percent by volume of the cleaning solution; sodium lauriminodipropionate within a range between about 0.03 percent and 1.0 percent by volume of the cleaning solution; wherein the cleaning solution has a pH value in the range between about 2.5 and about 7.0.

According to still another example of the present technology, a cleaning solution for a turbine engine consists essentially of, or consists, of water within a range between about 68.65 percent and about 99.63 percent by volume of the cleaning solution; an organic acidic component within a range between about 0.1 percent and about 15 percent by volume of the cleaning solution; wherein the organic acid comprises citric acid; an organic acidic component within a range between about 0.1 percent and about 15 percent by volume of the cleaning solution; wherein the organic acid comprises glycolic acid; isoropylamine sulphonate within a range between about 0.07 percent and 0.14 percent by volume of the cleaning solution; alcohol ethoxylate within a range between about 0.035 percent and 0.07 percent by volume of the cleaning solution; triethanol amine within a range between about 0.035 percent and 0.07 percent by volume of the cleaning solution; sodium lauriminodipropionate within a range between about 0.03 percent and 1.0 percent by volume of the cleaning solution; wherein the cleaning solution has a pH value in the range between 2.5 and 7.0.

According to yet another example of the present technology, a reagent composition for a cleaning solution for a turbine engine comprises, consists essentially of, or consists of an organic acidic component within a range between about 0.1 percent and about 15 percent by volume of the cleaning solution; wherein the organic acid comprises citric acid; an organic acidic component within a range between about 0.1 percent and about 15 percent by volume of the cleaning solution; wherein the organic acid comprises glycolic acid; isoropylamine sulphonate within a range between about 0.07 percent and 0.14 percent by volume of the cleaning solution; alcohol ethoxylate within a range between about 0.035 percent and 0.07 percent by volume of the cleaning solution; triethanol amine within a range between about 0.035 percent and 0.07 percent by volume of the cleaning solution; sodium lauriminodipropionate within a range between about 0.03 percent and 1.0 percent by volume of the cleaning solution; wherein the reagent composition is titrated with an organic base to have a pH value in the range between about 4.0 and about 7.0.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
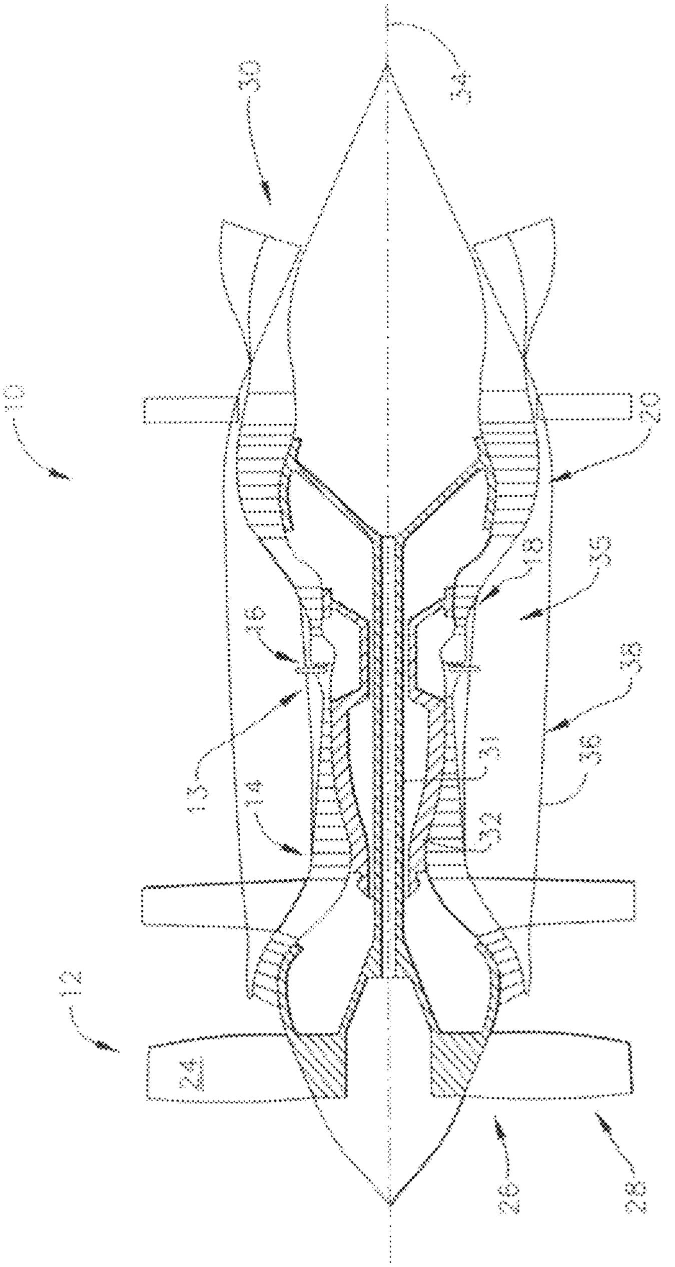
FIG. 1 is a cross-sectional view of an exemplary turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to methods of cleaning internal passages of a turbine engine. More specifically, surfaces in the internal passages of the turbine engine may accumulate mineral dust thereon after prolonged operation of the turbine engine. As used herein, "mineral dust" generally refers to naturally occurring granular material including particles of various rocks and minerals. For example, the mineral dust may be capable of becoming airborne at sub-38 microns in size, and accumulate in the turbine engine during taxi, take-off, climb, cruise, landing, as well as when the turbine engine is not in operation. The elemental composition and phase of the accumulated mineral dust varies based on a location of the mineral dust within sections of the turbine engine, and/or the operational environment of the turbine engine. For example, increased temperatures in the high-pressure turbine section caused by combustion result in increased temperatures on surfaces of the components therein. As such, mineral dust on the surfaces thermally react to form CMAS-based reaction products (e.g, $[(Ca,Na)_2(Al,Mg,Fe^{2+})(Al,Si)SiO_7])$, and subsequent layers of mineral dust accumulate on the surface of the reaction products.

The cleaning methods described herein use a cleaning solution that facilitates removing oxide-based, chloride-based, sulfate-based, and carbon-based constituents of the CMAS-based reaction products, interstitial cement, and the subsequent layers of accumulated mineral dust from the turbine components. More specifically, in the exemplary embodiment, the cleaning solution includes a reagent composition that selectively dissolves the constituents of the foreign material in the internal passages of the turbine engine. As used herein, "selectively dissolve" refers to an ability to be reactive with predetermined materials, and to be substantially unreactive with materials other than the predetermined materials. As such, the methods described herein facilitate removing reacted and unreacted foreign material from the turbine engine while being substantially unreactive with the material used to form the turbine components to limit damage to the underlying components.

FIG. 1 is a schematic view of an exemplary gas turbine engine 10 that includes a fan assembly 12 and a core engine 13 including a high pressure compressor 14, a combustor 16, a high-pressure turbine (HPT) 18, and a low-pressure turbine (LPT) 20. Fan assembly 12 includes an array of fan blades 24 that extend radially outward from a rotor disk 26. Engine 10 has an intake side 28 and an exhaust side 30. Fan assembly 12 and LPT 20 are coupled by a low-speed rotor shaft 31, and compressor 14 and HPT 18 are coupled by a high-speed rotor shaft 32. Turbine engine 10 may be any type of gas or combustion turbine aircraft engine including but not limited to turbofan, turbojet, turboprop, turboshaft engines as well as geared turbine engines such as geared turbofans, un-ducted fans and open rotor configurations. Alternatively, turbine engine 10 may be any type of gas or combustion turbine engine, including but not limited to land-based gas turbine engine in simple cycle, combined cycle, cogeneration, marine and industrial applications.

Generally, in operation, air flows axially through fan assembly 12, in a direction that is substantially parallel to a centerline 34 that extends through engine 10, and compressed air is supplied to high pressure compressor 14. The highly compressed air is delivered to combustor 16. Combustion gas flow (not shown) from combustor 16 drives turbines 18 and 20. HPT 18 drives compressor 14 by way of shaft 32 and LPT 20 drives fan assembly 12 by way of shaft 31. Moreover, in operation, foreign material, such as mineral dust, is ingested by turbine engine 10 along with the air, and the foreign material accumulates on surfaces therein.

As used herein, the term "axial", "axially", or "coaxially" refers to a direction along or substantially parallel to centerline 34. Furthermore, as used herein, the term "radial" or "radially" refers to a direction substantially perpendicular to centerline 34.

Figure 2:
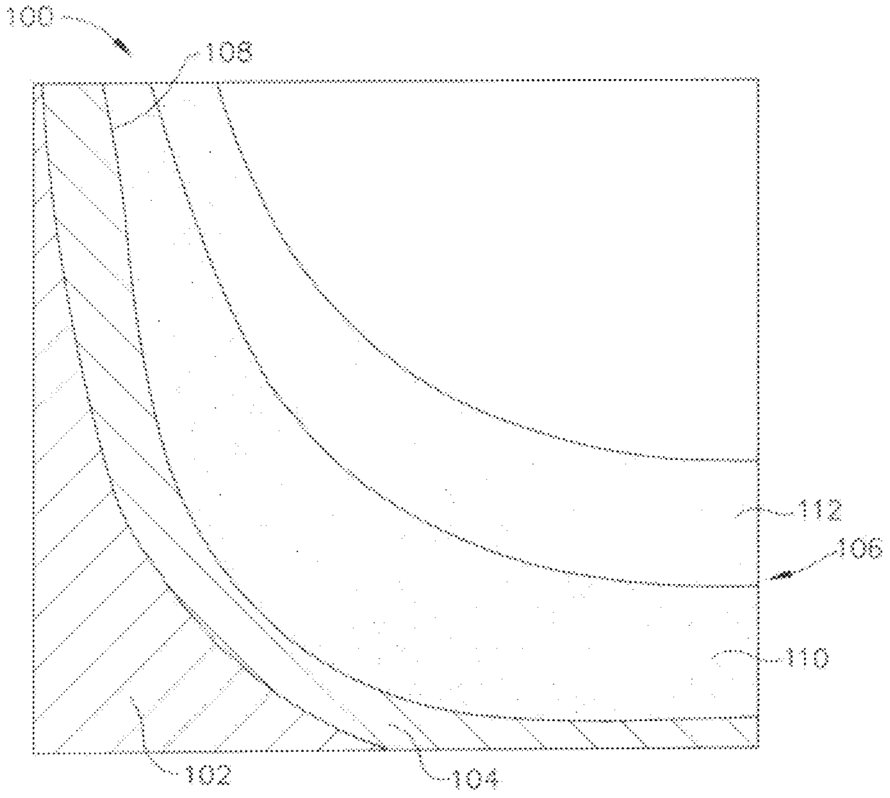
FIG. 2 is a cross-sectional view of an exemplary component in the high-pressure turbine section of the turbine engine shown in FIG. 1.
Figure 3:
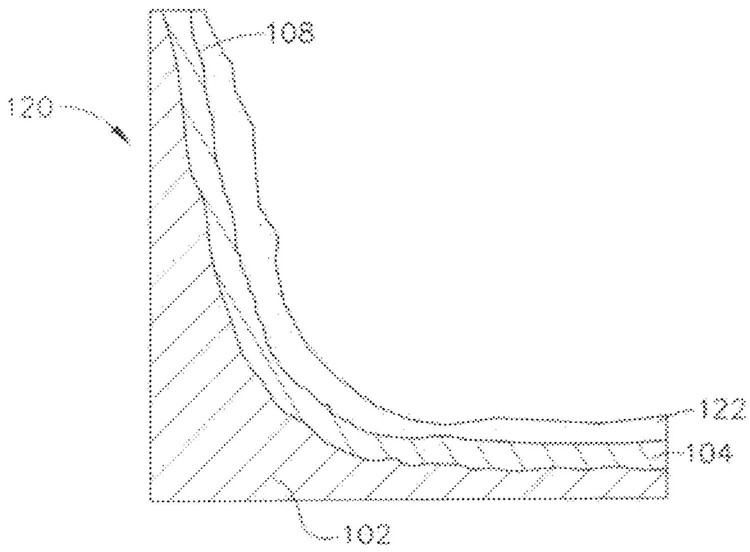
FIG. 3 is a cross-sectional view of an alternative component in the high-pressure turbine section of the turbine engine shown in FIG. 1.

FIGS. 2 and 3 are cross-sectional views of exemplary turbine components 100 and 120 in HPT 18 section of turbine engine 10 (shown in FIG. 1). Referring to FIG. 2, in the exemplary embodiment, component 100 includes a substrate 102 and a protective coating 104 on substrate 102. Protective coating 104 is fabricated from a metallic material and facilitates improving the service life of turbine component 100. Alternatively, protective coating 104 may be fabricated from a non-metallic material including but not limited to rare earth element ceramic oxides. A layer 106 of foreign material is formed on turbine component 100 and, more specifically, on a surface 108 of protective coating 104. Layer 106 includes a first sub-layer 110 extending at least partially over surface 108, and a second sub-layer 112 extending at least partially over first sub-layer 110. In an alternative embodiment, component 100 does not include a protective coating on substrate 102.

Referring to FIG. 3, in the exemplary embodiment, component 120 includes substrate 102 and protective coating 104 on substrate 102. A layer 122 of foreign material is formed on component 120 and, more specifically, on surface 108 of protective coating 104. In the exemplary embodiment, layer 122 does not include first and second sub-layers 110 and 112 (each shown in FIG. 2) of foreign material. For example, component 120 may include layer 122 as a result of operating in a turbine engine that ingests less foreign material than a turbine engine including component 100.

Exemplary turbine components include, but are not limited to, shrouds, buckets, blades, nozzles, vanes, seal components, valve stems, nozzle boxes, and nozzle plates. Moreover, substrate 102 is fabricated from a metallic material. As used herein, the term "metallic" may refer to a single metal or a metal alloy. Exemplary metallic materials include, but are not limited to, nickel, titanium, aluminum, vanadium, chromium, iron, and cobalt. Alternatively, substrate 102 may be fabricated from a non-metallic material, including but not limited to ceramic matrix composites (CMCs), polymer matrix composites (PMCs) as well as other non-metallic materials.

Referring again to FIG. 2, first sub-layer 110 and second sub-layer 112 of foreign material have different elemental compositions. As used herein, the term "foreign material" may refer to material entering turbine engine 10 during operation that is not a specified engine design component. More specifically, during operation, combustion gases formed in combustor 16 are channeled downstream towards HPT 18 (shown in FIG. 1) and facilitate increasing a temperature of component 100. The increased temperature of component 100 facilitates initiating thermal reactions in the foreign material adjacent to surface 108 of component 100. Thermal alteration of the foreign material facilitates forming a glassy amorphous phase and facilitates changing the elemental composition of the foreign material. Referring again to FIG. 3, the increased temperature of component 120 during operation of turbine engine 10 facilitates initiating thermal reactions in the foreign material adjacent to surface 108 of component 120.

Figure 4:
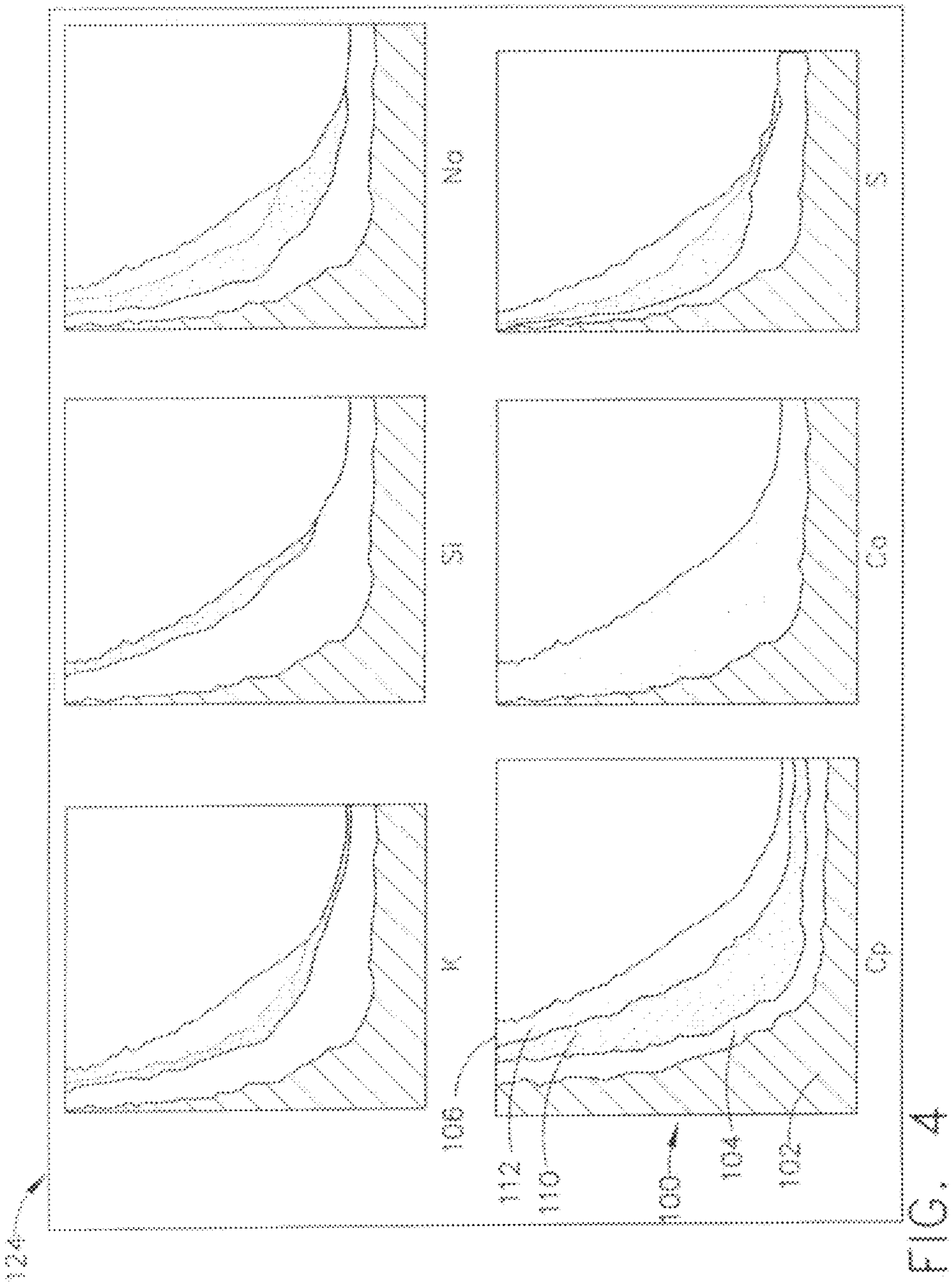
FIG. 4 is an electron microprobe analysis image of the component shown in FIG. 2.
Figure 5:
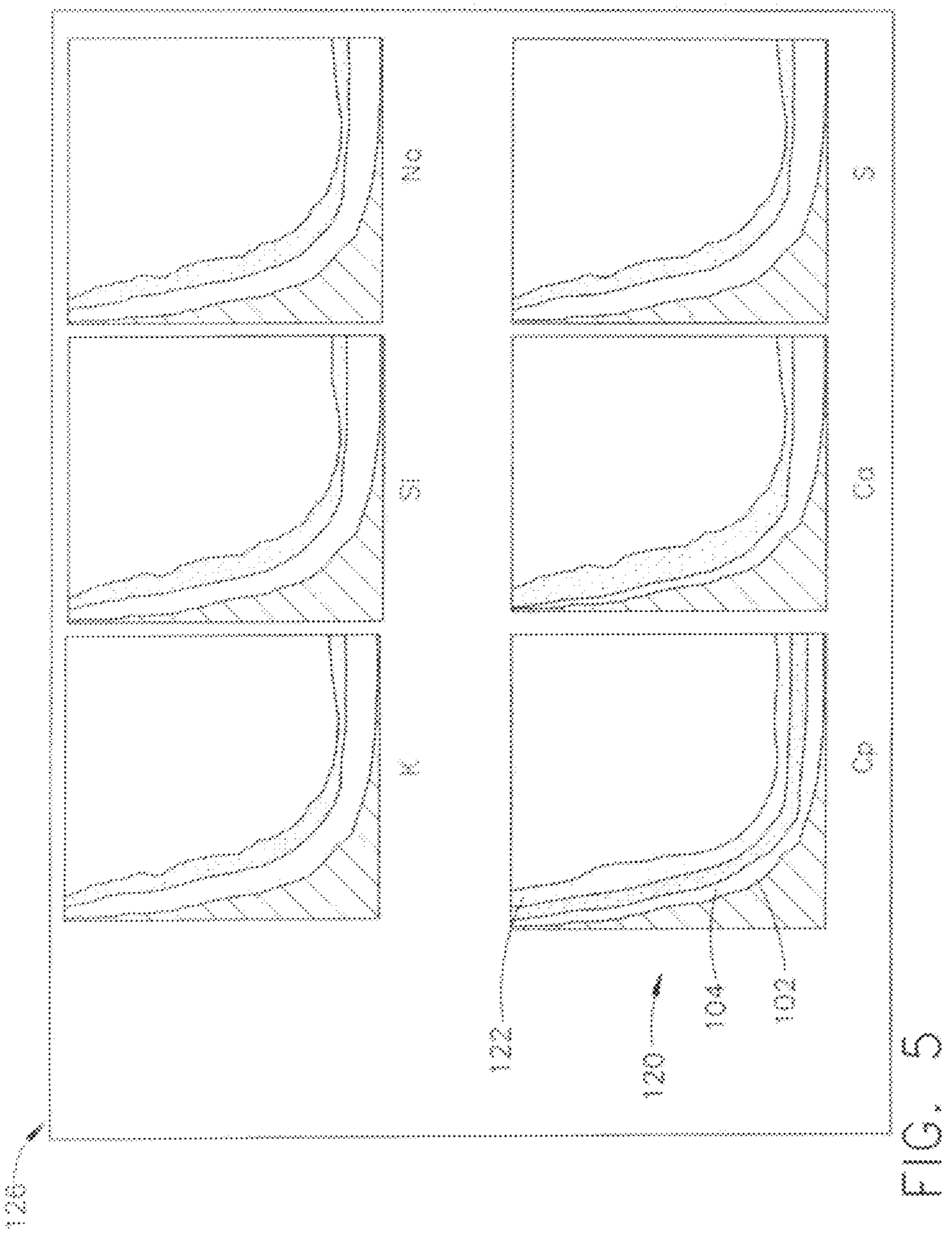
FIG. 5 is an electron microprobe analysis image of the component shown in FIG. 3.

FIGS. 4 and 5 are electron microprobe analysis (EMPA) images 124 and 126 of turbine components 100 and 120, respectively. In the exemplary embodiment, EMPA is used to perform an elemental analysis of layers 106 and 122 on components 100 and 120, respectively. Referring to FIG. 4, delineation between first and second sub-layers 110 and 112 is shown by the elemental analysis of potassium and sulfur in image 124. More specifically, as shown in image 124, first sub-layer 110 is formed from CMAS-based reaction products and feldspar as shown by the enrichment of sodium, silicon, and calcium throughout layer 106. Second sub-layer 112 is formed from sulfates, micas and/or clays, CMAS-based reaction products, silicates, quartz, and feldspar, for example, as shown by the enrichment of potassium and sulfur in second sub-layer 112. For example, second sub-layer 112 has a greater sulfur concentration than first sub-layer 110 because sulfates in second sub-layer 112 are disposed interstitially to the silicates. As such, first sub-layer 110 is formed at least partially from CMAS-based reaction products, and second sub-layer 112 is formed generally from unreacted foreign material and interstitial cement. As used herein, the term "interstitial cement" may refer to secondary material positioned within the void space of mineral dust accumulations of foreign material. Exemplary interstitial cements include, but are not limited to, carbonates, calcites, dolomites, and sulfates. In alternative embodiments, first and second sub-layers 110 and 112 have elemental compositions based on an ambient environment surrounding turbine engine 10.

Referring to FIG. 5, as shown in image 126, layer 122 is formed from sulfates, micas and/or clays, CMAS-based reaction products, silicates, quartz, and feldspar, for example. More specifically, the composition of layer 122 is shown by the substantially uniform enrichment of sodium, silicon, potassium, sulfur, and calcium throughout layer 122. As such, layer 122 is a single layer of foreign material formed at least partially from at least one of CMAS-based reaction products and interstitial cement.

In the exemplary embodiment, a cleaning solution (not shown) is used to remove foreign material from turbine component 100. The cleaning solution includes a reagent composition that selectively dissolves constituents of the foreign material in both the first and second sub-layers 110 and 112 while physically removing silicate material therein. For example, the reagent composition has a formulation that selectively dissolves at least one of oxide-based, chloride-based, sulfate-based, and carbon-based constituents of the foreign material. More specifically, the reagent composition has a formulation that selectively dissolves oxide-based constituents of the foreign material including calcium, sulfur, sodium, potassium, magnesium, silicon, and/or aluminum. Exemplary oxide-based and sulfate-based constituents include, but are not limited to, calcium sulfate, magnesium sulfate, silicon dioxide (i.e., quartz), feldspars, mica, and clay. The reagent composition also selectively dissolves chloride-based constituents of the foreign material including sodium and/or potassium. Exemplary chloride-based constituents include, but are not limited to, sodium chloride and potassium chloride. The reagent composition also selectively dissolves carbon-based constituents of the foreign material including calcium, oxygen, and/or magnesium. Exemplary carbon-based constituents include, but are not limited to, calcium carbonate and magnesium carbonate.

The reagent composition also has a formulation that is substantially unreactive with materials other than the oxide-based, chloride-based, sulfate-based, and carbon-based constituents of the foreign material. More specifically, the reagent composition is substantially unreactive with metallic materials such as, but not limited to, nickel, titanium, aluminum, vanadium, chromium, iron, and cobalt. Similarly, the reagent composition is substantially unreactive with non-metallic materials used to fabricate the protective coating 104 and/or substrate 102 discussed herein, including but not limited to rare earth element ceramic oxides, ceramic matrix composites, polymeric matrix composites and other non-metallic composite materials. As such, damage to protective coating 104 and/or substrate 102 of turbine component 100 is substantially limited.

In the exemplary embodiment, the cleaning solution includes a reagent composition having water within a range between about 25 percent and about 70 percent by volume of the reagent composition, an acidic component within a range between about 1 percent and about 50 percent by volume of the reagent composition, and an amine component within a range between about 1 percent and 40 percent by volume of the reagent composition. It is believed, without being bound by any particular theory, that the acidic component is a primary driver that facilitates selective dissolution of the oxide-based, chloride-based, sulfate-based, and carbon-based constituents of the foreign material. Exemplary acidic components include, but are not limited to, citric acid, glycolic acid, poly acrylic acid, and combinations thereof. It is also believed, without being bound by any particular theory, that the amine component acts as a surfactant that facilitates reducing the surface tension between the cleaning solution and the foreign material. Exemplary amine components include, but are not limited to, monoisopropanol amine and triethanol amine.

In the exemplary embodiment, the cleaning solution is formed by diluting the reagent composition with water prior to directing the cleaning solution towards turbine component 100. The dilution is based on Federal Aviation Administration (FAA) guidelines. The FAA regulations provide acceptable elemental thresholds for compositions introduced into a turbine engine. As such, the reagent composition described herein is diluted by a factor of up to about 40 based on the formulation used to clean turbine engine 10. The resulting diluted cleaning solution will have any pH value that enables the cleaning solution to function as described herein. In the exemplary embodiment, the pH value of the cleaning solution is less than about 5.

In one embodiment, a first reagent composition includes water within a range between about 40 percent and about 60 percent by volume of the reagent composition, dipropylene glycol monoethyl ether within a range between about 20 percent and about 30 percent by volume of the reagent composition, propylene glycol n-butyl ether within a range between about 1 percent and about 10 percent by volume of the reagent composition, monoisopropanol amine within a range between about 1 percent and about 5 percent by volume of the reagent composition, and glycolic acid within a range between about 1 percent and about 5 percent by volume of the reagent composition. In this embodiment, the reagent composition is LUMINOX® ("LUMINOX" is a registered trademark of Alconox, Inc. of White Plains, New York). In the exemplary embodiment, the cleaning solution is formed by diluting the first reagent composition with water by a factor of up to about 18, where sodium is the limiting dilution factor.

In another embodiment, a second reagent composition includes water within a range between about 25 percent and about 35 percent by volume of the reagent composition, dipropylene glycol monoethyl ether within a range between about 15 percent and about 25 percent by volume of the reagent composition, monoisopropanol amine within a range between about 30 percent and about 40 percent by volume of the reagent composition, alcohol alkoxylate within a range between about 1 percent and about 5 percent by volume of the reagent composition, and ethylene glycol butyl ether within a range between about 5 percent and about 10 percent by volume of the reagent composition. In this embodiment, the reagent composition is DETERGENT 8® ("DETERGENT 8" is a registered trademark of Alconox, Inc. of White Plains, New York). In the exemplary embodiment, the cleaning solution is formed by diluting the second reagent composition with water by a factor of up to about 3, where fluorine is the limiting dilution factor.

In another embodiment, a third reagent composition includes water within a range between about 50 percent and about 70 percent by volume of the reagent composition, glycolic acid within a range between about 5 percent and about 15 percent by volume of the reagent composition, citric acid within a range between about 5 percent and about 15 percent by volume of the reagent composition, triethanol amine within a range between about 2 percent and about 7 percent by volume of the reagent composition, and alcohol alkoxylate within a range between about 1 percent and about 5 percent by volume of the reagent composition. In this embodiment, the reagent composition is CITRAJET® ("CITRAJET" is a registered trademark of Alconox, Inc. of White Plains, New York). In the exemplary embodiment, the cleaning solution is formed by diluting the third reagent composition with water by a factor of up to about 32, where sodium is the limiting dilution factor.

In yet another embodiment, a fourth reagent composition includes water within a range between about 50 percent and about 70 percent by volume of the reagent composition, glycolic acid within a range between about 5 percent and about 15 percent by volume of the reagent composition, citric acid within a range between about 5 percent and about 15 percent by volume of the reagent composition, triethanol amine within a range between about 1 percent and about 5 percent by volume of the reagent composition, alcohol alkoxylate within a range between about 1 percent and about 5 percent by volume of the reagent composition, and isopropylamine sulfonate within a range between about 1 percent and about 10 percent by volume of the reagent composition. In this embodiment, the reagent composition is CITRANOX® ("CITRANOX" is a registered trademark of Alconox, Inc. of White Plains, New York). In the exemplary embodiment, the cleaning solution is formed by diluting the fourth reagent composition with water by a factor of up to about 35, where sulfur is the limiting dilution factor.

Figure 6:
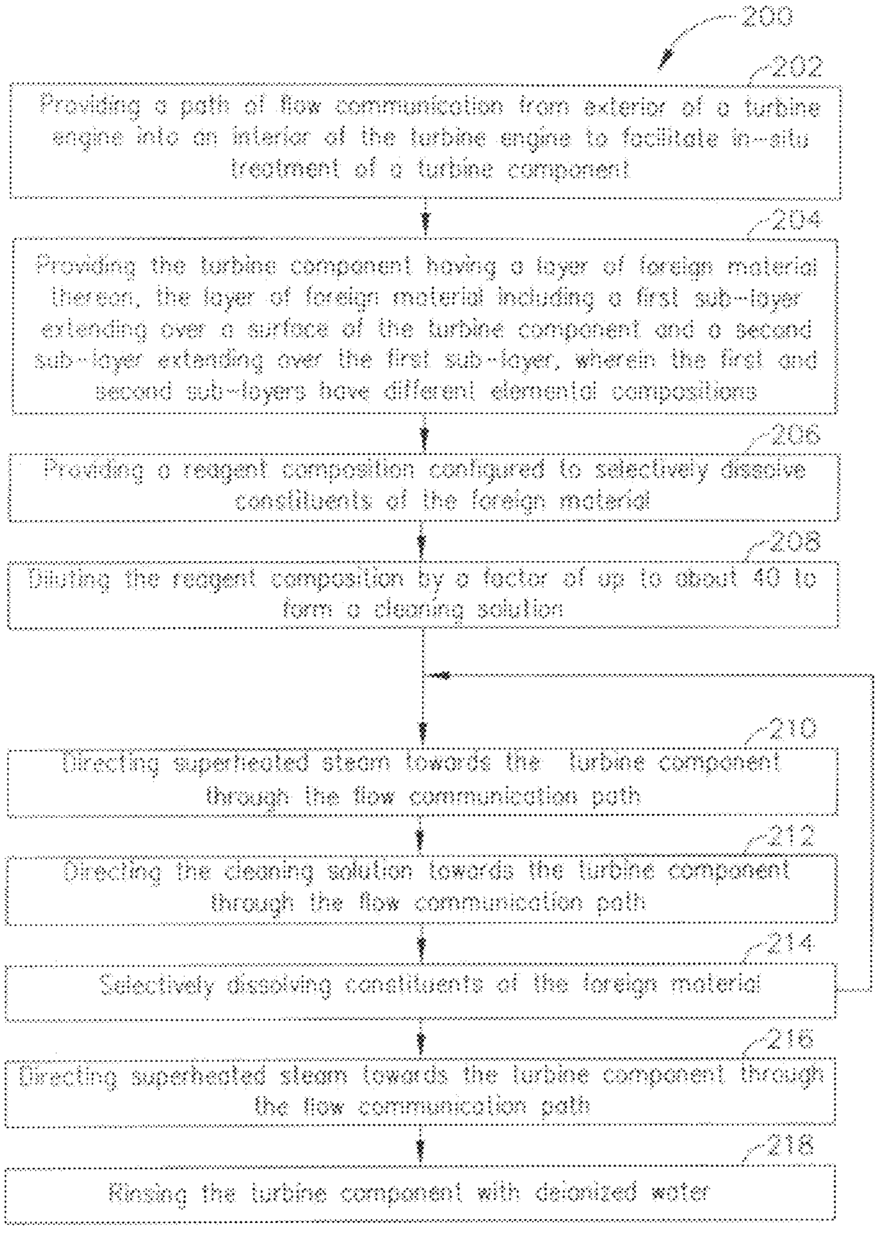
FIG. 6 is a flow diagram of an exemplary method of cleaning a turbine engine.
Figure 7:
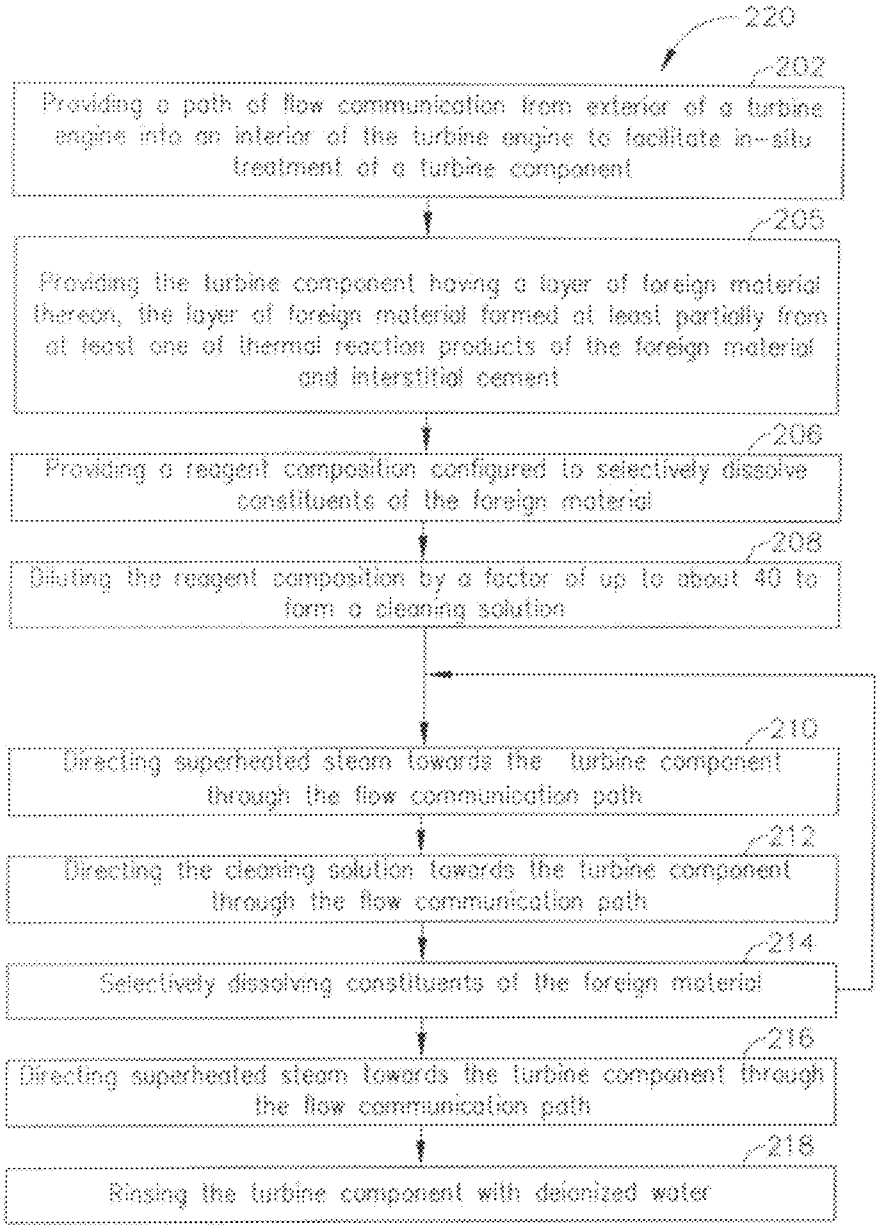
FIG. 7 is a flow diagram of an alternative method of cleaning a turbine engine.

FIG. 6 is a flow diagram of an exemplary method 200 of cleaning turbine engine 10 (shown in FIG. 1), and FIG. 7 is a flow diagram of an exemplary method 220 of cleaning turbine engine 10. In the exemplary embodiment, method 200 includes providing 202 a path of flow communication from exterior of turbine engine 10 into an interior 35 of turbine engine 10. The path of flow communication is through openings 38 in outer wall 36 of turbine engine 10 to facilitate in-situ treatment of turbine component 100. In the exemplary embodiment, the openings are borescope apertures, burner apertures, pressure sensor ports and taps, and/or fuel nozzle apertures, for example.

Method 200 also includes providing 204 turbine component 100 having layer 106 of foreign material thereon. Turbine component 100 may be positioned within turbine engine 10 in-situ, or may be removed from turbine engine 10 and cleaned in a service repair shop environment. The layer 106 includes first sub-layer 110 extending at least partially over surface 108 of protective coating 104 and second sub-layer 112 extending at least partially over first sub-layer 110. As described above, first and second sub-layers 110 and 112 of layer 106 of foreign material have different elemental compositions. A reagent composition is provided 206 that is configured to selectively dissolve constituents of the foreign material. Alternatively, as shown in FIG. 7, method 220 includes providing 205 turbine component 120 having layer 122 of foreign material thereon formed at least partially from at least one of thermal reaction products of the foreign material and interstitial cement. The reagent composition is then diluted 208 by a factor of up to about 40 to form the cleaning solution.

Cycles of alternating cleaning fluids are directed towards turbine component 100 to facilitate removing foreign material from turbine component 100. More specifically, method 200 includes directing 210 superheated steam towards turbine component 100 through openings 38, and directing 212 the cleaning solution towards turbine component 100 through openings 38. The superheated steam facilitates pre-heating a flow path for the cleaning solution, and the cleaning solution selectively dissolves 214 the oxide-based, chloride-based, sulfate-based, and carbon-based constituents of the foreign material. In the exemplary embodiment, the method includes directing a first cycle of cleaning fluids towards turbine component 100, and directing a second cycle of cleaning fluids towards turbine component 100. In the first and second cleaning cycles, the superheated steam is directed 210 towards turbine component 100 before the cleaning solution to facilitate increasing the effectiveness of the cleaning solution. As such, the first cycle facilitates increasing the porosity of layer 106 of foreign material by selectively dissolving sulfates disposed interstitially to silicates of layer 106, for example. The second cycle further selectively dissolves constituents of the foreign material by entering open pores (not shown) formed in layer 106 by the first cycle of cleaning fluids. After the first and second cycles are complete, another application of superheated steam is directed 216 towards turbine component 100, and turbine component 100 is rinsed 218 with deionized water. Alternatively, any cleaning sequence that enables the method to function as described herein may be used to remove foreign material from turbine component 100. Further, in an alternative embodiment, different cleaning solutions may be used in the first and second cleaning cycles.

The cleaning fluids are directed towards turbine component 100 at any process conditions that enable the method to function as described herein. For example, the process conditions may be modified based on a desired rate of removal of the foreign material from turbine component 100, and properties of the foreign material being removed. In the exemplary embodiment, the cleaning solution is directed towards turbine component 100 for a duration of less than about 200 minutes, at a temperature within a range between about 15° C. and about 200° C., at a pressure within a range between about 1 atmosphere and about 50 atmospheres, and at a flow rate within a range between about 100 milliliters per minute and about 250 milliliters per minute. Moreover, the superheated steam is directed towards turbine component 100 for a duration of less than about 200 minutes, and at a pressure within a range between about 1 atmosphere and about 10 atmospheres.

The cleaning may be carried out by using, for example, the methods, systems, and detergents disclosed in U.S. application Ser. No. 14/621,465, filed Feb. 13, 2015, entitled DETERGENT DELIVERY METHODS AND SYSTEMS FOR TURBINE ENGINES, the contents of which are incorporated herein by reference.

EXAMPLES

The following non-limiting simulations are provided to further illustrate the systems and methods described herein.

Weight Removal Analysis

Cleaning fluids were directed towards components of a turbine engine to facilitate removing foreign material therefrom. More specifically, high-pressure turbine shrouds of commercial turbofan turbine engines were removed from the engines and cleaned as described herein. Table 1 presents data for shrouds from a first turbine engine cleaned with CITRANOX® at a 35× dilution factor, and Table 2 presents data for shrouds from a second turbine engine cleaned with CITRAJET® at a 32× dilution factor. The flows of cleaning solution were directed at varying temperatures and flow rates for a duration of about 16 minutes.

The results are presented in Tables 1 and 2 below. The shrouds were weighed at predetermined intervals to determine the effectiveness of the cleaning solutions at removing foreign material. The shrouds were weighed before application of the cleaning solution, after application of the cleaning solution (Wt. Washed From Part), and after removing remaining foreign material from the shrouds mechanically (Total Dust Removed). As such, a dust removal percentage via the cleaning solution was determined. Moreover, the weight removal of each element was determined using Inductively Coupled Plasma Optical Emission Spectrometry (ICP-OES) on the effluent detergent.

TABLE 1

| Shroud # | Flow Rate (mL/min) | Temp (° C.) | Ca (mg) | Mg (mg) | Si (mg) | Wt. Washed From Part (mg) | Total Dust Removed (mg) | % Removal via Wash |
|---|---|---|---|---|---|---|---|---|
| 13 | 200 | 80 | 34.4 | 4.19 | 9.91 | 178.5 | EMPA | EMPA |
| 38 | 200 | 22 | 13.2 | 1.25 | 4.8 | 93 | 194.4 | 47.8 |
| 2 | 200 | 80 | 39.5 | 4.9 | 11.9 | 191.8 | 283.4 | 67.7 |
| 12 | 200 | 22 | 16.9 | 1.7 | 6.1 | 97.3 | 180.9 | 53.8 |

TABLE 1-continued

| Shroud # | Flow Rate (mL/min) | Temp (° C.) | Ca (mg) | Mg (mg) | Si (mg) | Wt. Washed From Part (mg) | Total Dust Removed (mg) | % Removal via Wash |
|---|---|---|---|---|---|---|---|---|
| 3 | 170 | 40 | 24.3 | 3.06 | 7.03 | 142.3 | 221.2 | 64.3 |
| 39 | 150 | 50 | 26 | 2.8 | 8.74 | 136.7 | 246 | 55.6 |
| 15 | 150 | 50 | 18.9 | 1.81 | 5.99 | 129.1 | 217.3 | 59.4 |
| 1 | 120 | 70 | 28.3 | 3.65 | 8.48 | 158.3 | 237.6 | 66.6 |
| 16 | 100 | 80 | 28.5 | 3.66 | 8.94 | 148.7 | 247.8 | 60 |
| 40 | 100 | 22 | 12.8 | 1.28 | 4.86 | 76.2 | 165.8 | 46 |
| 11 | 100 | 22 | 11.8 | 1.21 | 4.93 | 74.1 | 165.9 | 44.7 |
| 4 | 100 | 80 | 31.2 | 4.4 | 9.4 | 152.8 | 247.8 | 61.7 |
| 14 | 100 | 22 | 12.7 | 1.3 | 4.9 | 91.1 | 171.3 | 53.2 |

TABLE 2

| Shroud # | Flow Rate (mL/min) | Temp (° C.) | Ca (mg) | Mg (mg) | S (mg) | Si (mg) | Wt. Washed From Part (mg) | Total Dust Removed (mg) | % Removal via Wash |
|---|---|---|---|---|---|---|---|---|---|
| 3 | 200 | 80 | 45.7 | 5.64 | 23.6 | 12.8 | 211.1 | 278.5 | 75.8 |
| 39 | 200 | 22 | 18.8 | 1.27 | 10.8 | 5.4 | 117.6 | 215.6 | 54.5 |
| 9 | 170 | 40 | 30.8 | 2.51 | 17.3 | 8.9 | 151.1 | 254.5 | 59.4 |
| 13 | 150 | 50 | 30.9 | 3.25 | 14.5 | 9.5 | 146.6 | 254.6 | 57.6 |
| 2 | 150 | 50 | 28.8 | 2.79 | 15.5 | 8.1 | 155.4 | 239.3 | 64.9 |
| 17 | 150 | 50 | 31.36 | 2.99 | 16.25 | 9.04 | 144.1 | 249.8 | 57.7 |
| 18 | 150 | 50 | 28.42 | 2.63 | 14.22 | 8.52 | 122.4 | 235.2 | 52 |
| 37 | 130 | 60 | 40.4 | 4.03 | 22.4 | 10.6 | 171.9 | 261.4 | 65.8 |
| 1 | 100 | 80 | 35.2 | 4.14 | 20.2 | 8.8 | 182.4 | 278.5 | 65.5 |
| 11 | 100 | 80 | 38.5 | 4.97 | 19.4 | 11.3 | 177.5 | 274.7 | 64.6 |
| 14 | 100 | 22 | 22.9 | 1.98 | 11.3 | 7.1 | 113.6 | 201.4 | 56.4 |

Accordingly, cleaning the shrouds with cleaning solution at higher flow rates and/or temperatures facilitated removing more foreign material than at lower flow rates and/or temperatures. For example, shroud 3 cleaned at a flow rate of 200 milliliters per minute (mL/min) and at a temperature of 80° C. removed 75.8% of the foreign material, and shroud 14 cleaned at a flow rate of 100 mL/min and at a temperature of 22° C. removed 56.4% of the foreign material.

Moreover, it should be noted that the total dust removed and the percent removal via wash for Shroud 13 of the CITRANOX® wash shown in Table 1 could not be obtained because Shroud 13 was mounted in epoxy, cross-sectioned, and polished to facilitate EMPA mapping analysis. As such, Shroud 13 could not be scrubbed to remove remaining dust from the shroud to facilitate calculating the total dust removed and the percent removal via wash for Shroud 13. It should further be noted that Table 1 is the result of cleaning with CITRANOX®, which includes a sulfonate amine complex. Therefore, it was not possible to deconvolute the sulfur composition resulting from the sulfur present in the foreign material vs the sulfur present in the detergent. Table 2 is the result of cleaning with CITRAJET®, which does not include a sulfonate amine complex. Therefore, the reduction in sulfur content on the shroud as a result of the cleaning sequences can be calculated. This explains why Table 1 does not have an "S" column but Table 2 does.

Elemental Concentration Analysis

The shrouds cleaned by the cleaning solutions described above were evaluated to determine relative elemental concentrations of the foreign material before and after applying each cleaning solution. The elemental analysis for the shrouds cleaned with CITRANOX® is presented in Table 3, and the elemental analysis for the shrouds cleaned with CITRAJET® is presented in Table 4.

Moreover, shrouds cleaned by different cleaning sequences including alternating applications of superheated steam and cleaning solution were evaluated to determine relative elemental concentrations of the foreign material before and after completion of each cleaning sequence. Sequence 1 includes an application of superheated steam at a temperature of 187° C. and a duration of 16 minutes. Sequence 2 includes an application of 32× diluted CITRAJET® at a flow rate of 100 mL/min, a temperature of 80° C., and a duration of 16 minutes, and an application of superheated steam at temperature of 187° C. and for a duration of 5 minutes. Sequence 3 includes an application of 32× diluted CITRAJET® at a flow rate of 200 ml/min, a temperature of 80° C., and a duration of 16 minutes, and an application of superheated steam at temperature of 187° C. and for a duration of 16 minutes. Sequence 4 includes an application of 32× diluted CITRAJET® at a flow rate of 200 mL/min, a temperature of 80° C., and for a duration of 16 minutes, and an application of superheated steam at temperature of 187° C. and for a duration of 16 minutes. Sequence 5 includes an application of 32× diluted CITRAJET® at a flow rate of 200 mL/min, a temperature of 80° C., and a duration of 16 minutes, and an application of superheated steam at temperature of 187° C. and for a duration of 16 minutes. Sequence 6 includes a first application of application of superheated steam at temperature of 187° C. and for a duration of 16 minutes, a first application of 32× diluted CITRAJET® at a flow rate of 200 mL/min, a temperature of 80° C., and for a duration of 16 minutes, a second application of the superheated steam, a second application of the 32× diluted CITRAJET®, and a third application of the superheated steam. The elemental analysis for the shrouds cleaned by sequences 1-6 is presented in Table 5.

The elemental analysis was conducted using a Bruker M4 Tornado micro x-ray fluorescence (μXRF) instrument including a Rh target micro focus X-ray tube set at 50 kilovolts (kV) and 450 micro-amps (μA), and a Bruker XFlash SDD detector. The instrument has a 25 micrometers (μm) at 17.4 kiloelectron volts (KeV) (Mo K) and ~60 μm at 1.49 KeV (AIK) spot size, and a Na—U vacuum atmosphere. The samples were positioned in the instrument, and maps were taken with a 100 μm pixel size. The samples were rapidly scanned by rastering each sample under the X-ray beam to acquire those maps. A 10 millisecond dwell time per pixel was used and the samples were scanned over 5 cycles. Parts were mapped before and after cleaning and the average spectra for a given mapped area before and after cleaning were compared giving a percent change in elemental signal. Percent changes in the signal of elements present the foreign material and elements in the substrate allow evaluation of the effectiveness of the cleaning conditions. It should be noted in Tables 3-5 below that numbers appearing in parenthesis represent negative numbers, or rather a decrease in the elemental composition as a result of the cleaning sequence. Thus, as a result of the cleaning, the overall shroud material composition becomes much closer to the original base metal while the foreign material elemental compositions (Ca, S and K) are correspondingly decreasing.

TABLE 3

| Shroud # | Ca (% change) | Si (% change) | S (% change) | Ni (% change) | Co (% change) | Cr (% change) | K (% change) | Fe (% change) |
|---|---|---|---|---|---|---|---|---|
| 13 | (37) | <5 | (71) | 8 | 10 | 16 | (33) | <5 |
| 38 | (20) | <5 | (56) | 11 | 12 | 17 | (17) | 7 |
| 3 | (29) | <5 | (78) | 8 | 10 | 13 | (50) | <5 |
| 15 | (28) | <5 | (67) | 7 | 9 | 16 | (33) | <5 |
| 39 | (28) | <5 | (73) | 7 | 10 | 17 | (40) | <5 |
| 1 | (35) | 7 | (77) | 8 | 11 | 16 | (43) | <5 |
| 11 | (21) | <5 | (50) | 6 | 9 | 12 | (20) | <5 |
| 16 | (28) | <5 | (60) | 11 | 13 | 20 | (40) | <5 |
| 40 | (25) | <5 | (61) | <5 | 6 | 10 | (33) | <5 |

TABLE 4

| Shroud # | Ca (% change) | Si (% change) | S (% change) | Ni (% change) | Co (% change) | Cr (% change) | K (% change) | Fe (% change) |
|---|---|---|---|---|---|---|---|---|
| 3 | (38) | 7 | (83) | 13 | 12 | 20 | (33) | 5 |
| 39 | (26) | <5 | (77) | 7 | 10 | 12 | (17) | 9 |
| 9 | (28) | <5 | (82) | 10 | 11 | 16 | (29) | 9 |
| 13 | (27) | <5 | (79) | 12 | 11 | 19 | (40) | 9 |
| 2 | (35) | (7) | (79) | <5 | <5 | 10 | (40) | <5 |
| 37 | (27) | <5 | (75) | 12 | 12 | 18 | (40) | 9 |
| 1 | (28) | 8 | (70) | 11 | 10 | 17 | (33) | 8 |
| 11 | (30) | 7 | (78) | 11 | 12 | 19 | (20) | 11 |
| 14 | (24) | <5 | (67) | 8 | 9 | 12 | (20) | 9 |

TABLE 5

| Shroud # | Sequence # | Ca (% change) | Si (% change) | S (% change) | Ni (% change) | Co (% change) | Cr (% change) | K (% change) | Fe (% change) |
|---|---|---|---|---|---|---|---|---|---|
| 15 | 1 | (11) | <5 | (71) | <5 | <5 | <5 | (20) | <5 |
| 40 | 2 | (34) | (7) | (81) | 6 | 6 | 12 | (40) | <5 |
| 16 | 3 | (33) | (10) | (76) | 18 | 13 | 27 | (67) | (15) |
| 10 | 4 | (35) | (10) | (82) | 14 | 12 | 22 | (40) | <5 |
| 12 | 5 | (39) | 14 | (86) | 17 | 13 | 23 | (67) | (20) |
| 4 | 6 | (45) | (26) | (90) | 16 | 13 | 23 | (60) | (30) |

Accordingly, as shown by the results presented in Tables 3 and 4, cleaning the shrouds using the cleaning solutions described above facilitated reducing the elemental concentrations of calcium, sulfur, and potassium in the samples. The cleaning solutions facilitated at least partially removing the first sub-layer of foreign material from the shrouds, and at least partially exposing the shroud (i.e., nickel, cobalt, chromium, and iron) and the second sub-layer of foreign material (i.e., silicate-based reaction product). As such, elemental concentrations of nickel, cobalt, chromium, iron, and silicon increased after the application of the cleaning solution.

Also, as shown by the results presented in Table 5, cleaning the shrouds using the cleaning sequences described above facilitated reducing the elemental concentrations of calcium, silicon, sulfur, and potassium in the samples. The cleaning sequences facilitated at least partially removing the first and second sub-layers of foreign material from the shrouds, and at least partially exposing the shroud. As such, elemental concentrations of nickel, cobalt, chromium, and iron increased, and an elemental concentration of silicon decreased. More specifically, removal of constituents of the first sub-layer enabled the cleaning solution to contact the second sub-layer to remove the silicate-based reaction product therefrom. As such, the shroud was exposed more effectively using the cleaning sequences described above than using only superheated steam or only cleaning solution to clean the shrouds.

Figure 8:
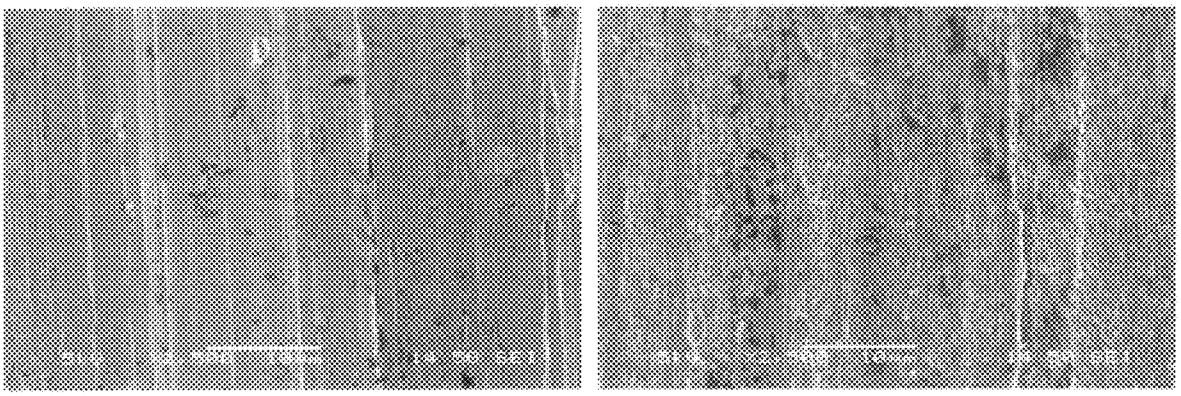
FIG. 8 shows corrosion of test panels exposed to cleaning solutions according to the present disclosure.

In a first example, Reagent 1 was used for cleaning shrouds. Reagent 1 consisted of the following formulation: 0.21 weight percent citric acid, 0.21 weight percent glycolic acid, 0.14 weight percent isopropylamine sulphonate, 0.07 weight percent alcohol ethoxylate, and 0.07 weight percent triethanol amine, and the balance of the cleaning solution was water; the total amount of active agents in the final reagent was 0.7 weight percent. In this first example a corrosion inhibitor, commercially available as RODINE® 2010, was added at a level of 0.01 weight percent; the RODINE® 2010-containing reagent is referred to as Reagent 2. Reagent 2 had a pH of approximately 3. Reagent 2 was used to clean the dust from the non-flow path surfaces of the shrouds from a commercial aircraft engine. This reagent effectively removed more than 50% by weight of the dust that had built up on the cooling surface of the shrouds from a commercial aircraft engine. In this regard the reagent was effective. When Reagent 2 was subjected to more comprehensive materials compatibility testing as required for use in cleaning aircraft engine components, as specified by Aerospace Material Specification (AMS) 1551a, Reagent 2 met all the requirements with the following exception of total immersion corrosion and stock loss associated with Mg alloy AMS 4376; this alloy was not considered for detergent qualification, as it is not typically used in commercial turbofan engines. Reagent 2 had a sodium level below the maximum permissible amount of 10 parts per million. Reagent 2 also had a measured sulfur content above the maximum permissible level for this intended use of 100 parts per million. Reagent 2 was subjected to additional testing, such as compatibility testing with advanced superalloys, as used for aircraft engine blades and disks, and high strength steels, such as turbine shaft materials, such as Marage250. When Reagent 2, including 0.010% RODINE® 2010 inhibitor was tested with a single crystal blade alloy, Reagent 2 generated corrosion pits that were of a size that was unacceptably close to the permissible limit. The pitting damage is shown in the micrographs of FIG. 8 and is theorized to be due to preferential etching of yttrium in the alloy by the 1,3-Diethyl-2-thiourea component of the RODINE® 2010 corrosion inhibitor. FIG. 8 shows an advanced single crystal alloy total immersion corrosion panels imaged at 2500× exposed to Reagent 2 (contained 0.01% RODINE® 2010) (right) relative to baseline metal (left)).

Figure 9:
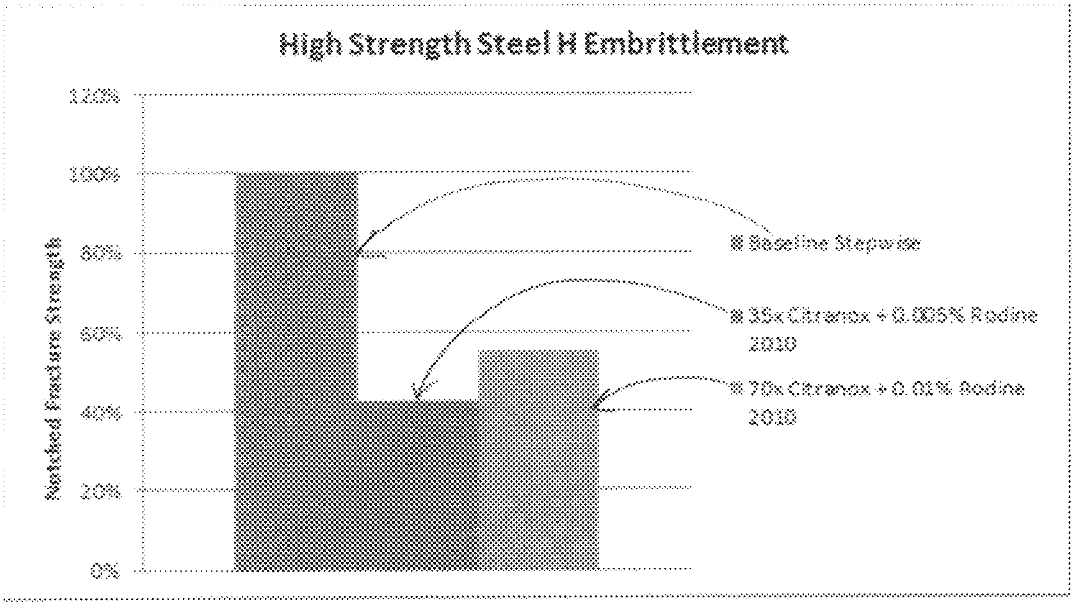
FIG. 9 shows tensile fracture strengths of high strength steel samples exposed to cleaning solutions according to the present disclosure.

High strength steel samples (such as maraging steels) were exposed to Reagent 1, including 0.005% RODINE® 2010 and a more dilute Reagent 4 with 0.010% RODINE® 2010 corrosion inhibitor for 6 days. After exposure, the samples were examined and subjected to incremental tensile strength measurement following ASTM method F1624. The samples showed visual evidence of corrosion, and tensile fracture strengths less than 60% of the strength of the same high strength steel that was not exposed to the reagents. The maximum allowable reduction in strength as a result of the exposure is 10%. The cleaning reagents shown in FIG. 9 (Reagents 2 & 5) had unacceptable performance in terms of their interaction with both advanced superalloys and high strength steels, as will be discussed in more detail subsequently.

Several further reagents were formulated and tested in order to overcome the limitations of Reagent 2. Specifically, additional corrosion inhibitors were explored, and higher pH levels were employed. These are described in the following examples.

In a second example, Reagent 3 was used for cleaning shrouds. Reagent 3 consisted of the following formulation: Reagent 1 plus 0.3% sodium lauriminodipropionate, which can be added directly, or in the form of a 1% solution of BASOCORR® 2005. BASOCORR® is a commercial product sold in a variety of formulations under different trade names that consists of sodium lauriminodipropionate, a primary amine reacted with acrylic acid. Functionally, it is a secondary surfactant that is used in a variety of industries from detergents as a foam booster, cleansing agent, or a viscosity builder to the cosmetics industry, or as a hair conditioning agent. It is also used in the oil industry where it is marketed as a low-cost solution to steel piping corrosion in the production and field treatment of crude oil as a persistent organic film-forming inhibitor at low concentrations. Reagent 3 had a pH of approximately 3. When Reagent 3 was subjected to more comprehensive testing as required for use in cleaning aircraft engine components, as specified by Acrospace Material Specification (AMS) 1551a, Reagent 3 did not meet all the requirements. Although Reagent 3 did demonstrate the ability to meet the AMS 5045 carbon steel total immersion corrosion rate requirement, the total sodium content was well in excess of the AMS threshold of 10 parts per million. This failure could readily be overcome by additional dilution, however, at a pH of 3 Reagent 3 was unstable and there was a white precipitate observed in Reagent 3 during use. The unstable nature of Reagent 3 made it unsuitable for cleaning aviation components.

In a third example, Reagent 4 was used for cleaning shrouds. Reagent 4 was similar to Reagent 1, but the pH was adjusted to a level of 5.5. Reagent 4 consisted of the following formulation: dilute Reagent 1 plus an organic base, Imidazole, with the formula $(CH)_2N(NH)CH$ in the crystalline form added by weight to titrate to a final pH of 5.5. Reagent 4 was used to clean the dust from the non-flow path surfaces of the shrouds from a commercial aircraft engine. Reagent 4 effectively removed more than 50% by weight of the dust that had built up on the cooling surface of the shrouds from a commercial aircraft engine. In this regard, Reagent 4 was judged effective. When Reagent 4 was subjected to more comprehensive testing as required for use in cleaning aircraft engine components, as specified by Acrospace Material Specification (AMS) 1551a, Reagent 4 did not meet all the requirements. Reagent 4 did not meet the AMS 5045 carbon steel total immersion corrosion rate requirement, but Reagent 4 met the limitation on the elemental sulfur and sodium requirements as specified by the AMS, each below 100 and 10 parts per million respectively.

Figure 10:
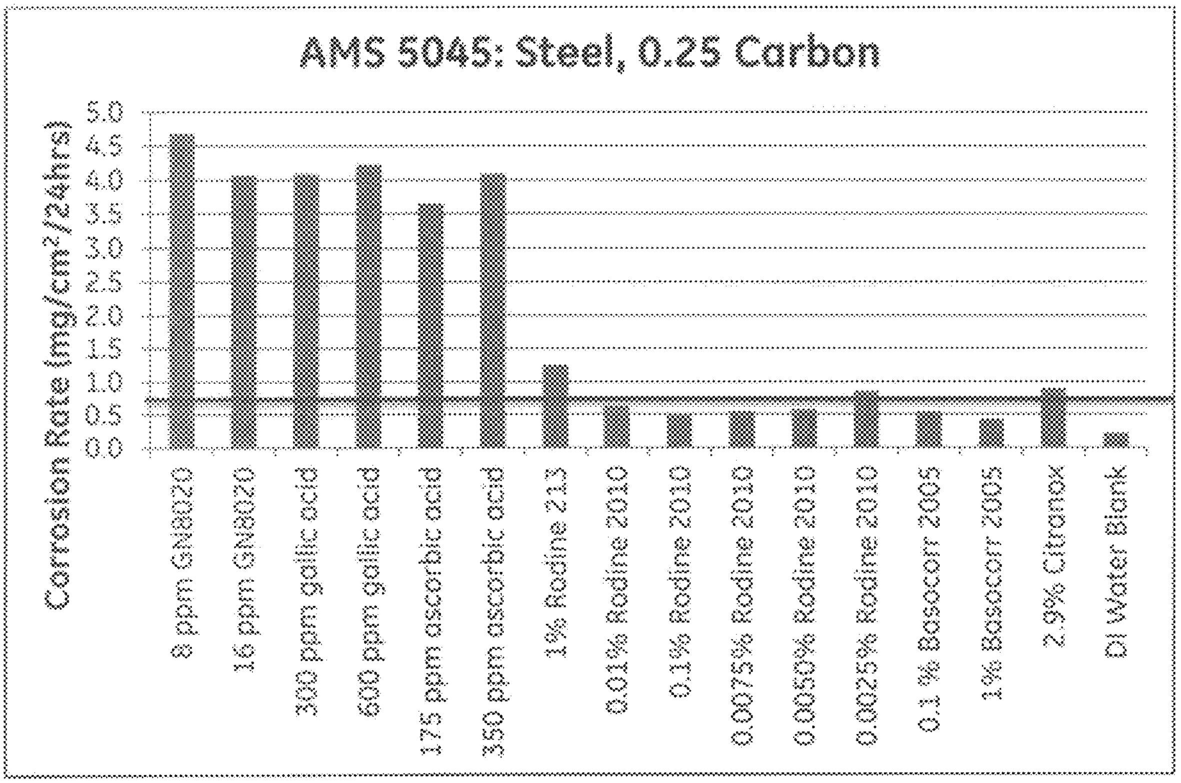
FIG. 10 shows total immersion corrosion rates for test coupons exposed to cleaning solutions according to the present disclosure.
Figure 11:
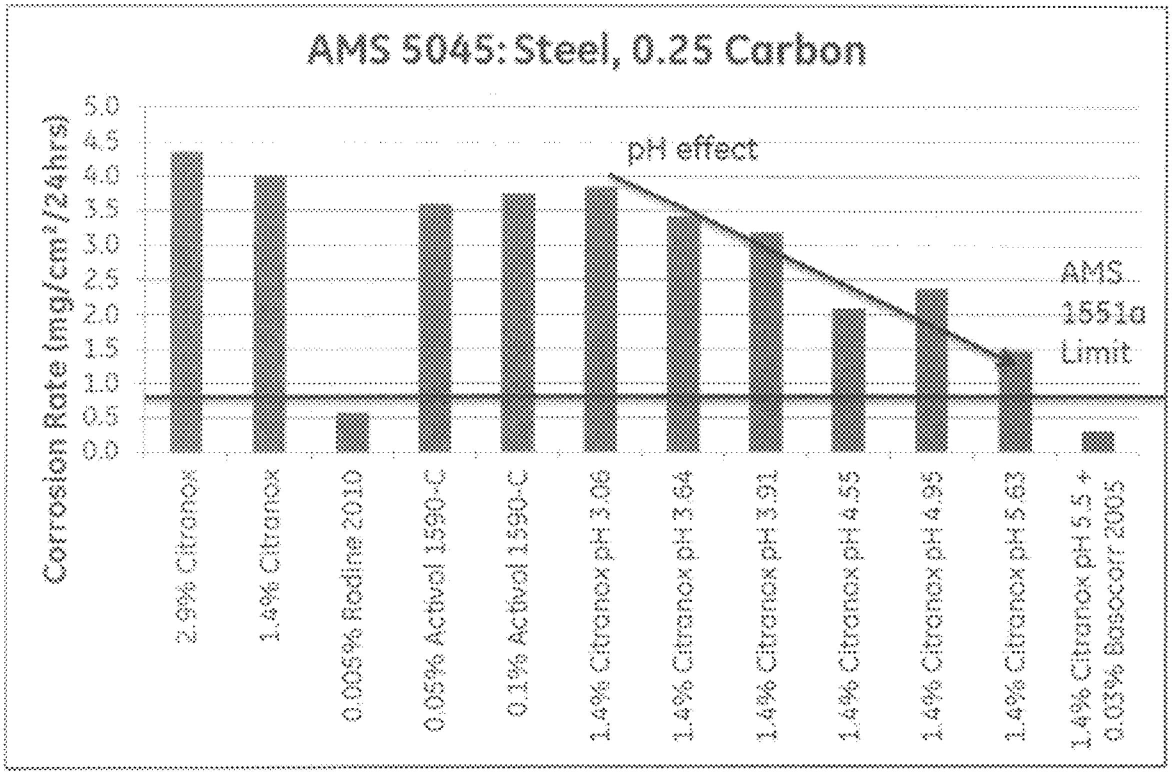
FIG. 11 shows total immersion corrosion rates for test coupons exposed to cleaning solutions according to the present disclosure.

Referring to FIG. 10, total immersion corrosion rate as measured by weight change of AMS 5045 coupons with 600 grit finish following 168 hour immersion in ambient 2.9% CITRANOX® doped with indicated corrosion inhibitor relative to 5MΩ deionized water and the AMS1551a limit are shown. Referring to FIG. 11, total immersion corrosion rate as measured by weight change of AMS5046 coupons with 600 grit finish following 168 hour immersion in ambient (except 1.4% CITRANOX® pH5.5+0.03% BASOCORR® 2005 run at 100° F.) 1.4% CITRANOX® doped with various corrosion inhibitors and at increasing pH's from titration with Imidazole relative to 2.9% CITRANOX® and the AMS1551a limit are shown.

In a fourth example, Reagent 5 was used for cleaning shrouds. Reagent 5 was similar to Reagent 2, but Reagent 2 was diluted and the RODINE® 2010 inhibitor concentration was maintained at 0.010%. Reagent 5 met the sulfur concentration criteria, but did not meet the requirement for hydrogen embrittlement, as described above with reference to FIG. 9.

Figure 12:
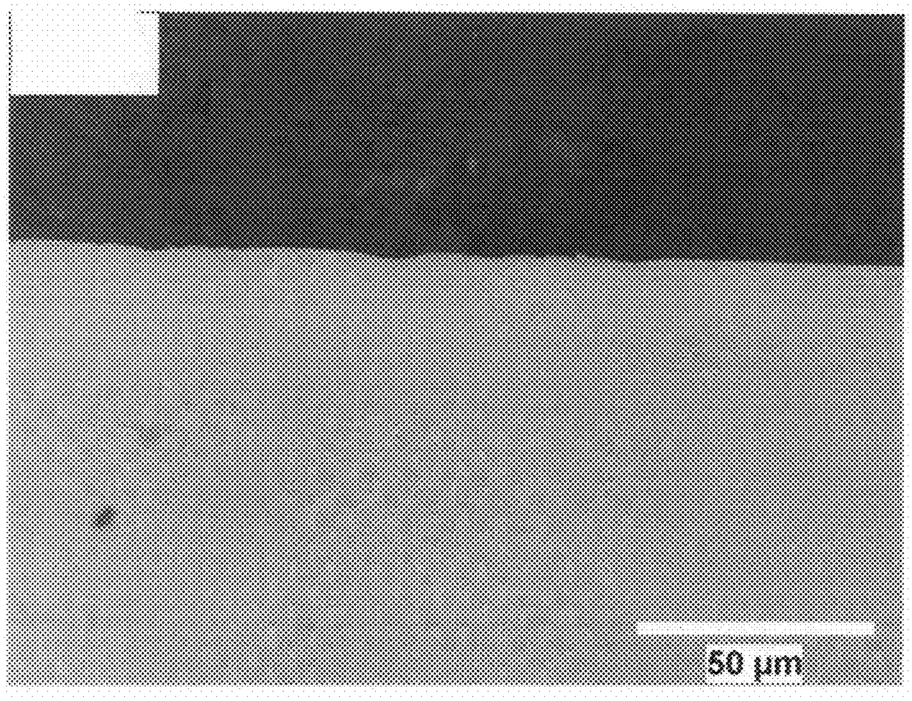
FIG. 12 shows an SEM cross section of a sample of high strength steel exposed to cleaning solution according to the present disclosure.

In a fifth example, Reagent 6 was used for cleaning shrouds. Reagent 6 is Reagent 4 with 0.03 weight percent BASOCORR® 2005 corrosion inhibitor at pH5.5. Reagent 6 was used to clean the dust from the non-flow path surfaces of the shrouds from a commercial aircraft engine. Reagent 6 effectively removed more than 50% by weight of the dust that had built up on the cooling surface of the shrouds from a commercial aircraft engine. In this regard, Reagent 6 was judged effective. When Reagent 6 was subjected to more comprehensive testing as required for use in cleaning aircraft engine components, as specified by AMS 1551a, Reagent 6 did meet all the requirements. Reagent 6 had measured sulfur and sodium contents below the AMS threshold of 100 and 10 parts per million, respectively. Reagent 6 also met the total corrosion rate requirement for AMS 5045 carbon steel. Reagent 6 was shown to be compatible with advanced superalloys, with no evidence of pitting corrosion or preferential etching at grain boundaries (shown in 500× magnification SEM cross section shown in FIG. 12). Reagent 6 was shown to be compatible with high strength steel samples (such as maraging steels) with no measured detriment to baseline tensile fracture strength for bars immersed in Reagent 6 for 6 days, followed by incremental step loading as prescribed by ASTM method F1624. At pH5.5, Reagent 6 was shown to be stable with respect to measured pH through time as well as no observed white precipitate upon formulation with the BASOCORR® 2005 inhibitor.

Cleaning Effectiveness Interaction with pH

Attempts were made to understand the correlation (if any) between cleaning solution pH level and cleaning effectiveness. It was not possible to categorize the effect of the pH level on cleaning effectiveness across the entire range of PH levels (~2.5 to 11+) of the cleaning reagents that were tested because the effect of the pH was comingled with the effect of the elemental compositions of the various reagents. The two effects could not be decoupled. However, when looking at a single reagent within a narrower range, a decrease in the cleaning effectiveness from 78% to 62% was noted when the pH was increased from about 3.5 to 5.5.

The systems and methods described herein facilitate removing accumulated foreign material from a turbine engine. More specifically, foreign material such as mineral dust accumulates within the internal passages of the turbine engine and blocks cooling passages therein, for example. In operation, as the mineral dust accumulates on components in the turbine engine, heat generated during combustion facilitates baking sub-layers of the mineral dust accumulations to change the elemental composition thereof. The cleaning solution described herein is formulated to selectively dissolve interstitial cements and both the reacted and unreacted sub-layers of the mineral dust accumulations. As such, the cleaning solution facilitates removing foreign material from a turbine engine while substantially limiting damage to underlying metallic components.

An exemplary technical effect of the methods, systems, and cleaning solution described herein includes at least one of (a) enabling in-situ cleaning of turbine engines; (b) selectively dissolving foreign material having different elemental compositions from turbine engines; and (c) reducing downtime of the turbine engines cleaned by the methods described herein.

Exemplary embodiments of the cleaning solution and associated methods of use are described above in detail. The cleaning solution and methods are not limited to the specific embodiments described herein, but rather, components of the solution and/or steps of the methods may be utilized independently and separately from other components and/or steps described herein. For example, the cleaning solution may also be used to clean other known turbine assemblies, and is not limited to practice with only the turbine engines as described herein. Rather, the exemplary embodiment can be implemented and utilized in connection with many applications where selective dissolution of foreign material is desirable.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cleaning solution for an in-situ aircraft turbine engine, the cleaning solution comprising:

at least a first organic acidic component within a range between about 0.1 percent and about 15 percent volume of the cleaning solution;

a surfactant within a range between about 0.07 percent and about 0.14 weight percent of the cleaning solution;

alcohol ethoxylate within a range between about 0.035 percent and about 0.07 weight percent of the cleaning solution;

monosodium-N-lauryl-B-iminodipropionic acid within a range between about 0.03 percent and about 1.0 percent volume of the cleaning solution; and an organic base that was added by weight to titrate the cleaning solution to a pH within a range of about 2.5 to about 7.0.

* * * * *